United States Patent
Boe

(10) Patent No.: US 6,746,194 B2
(45) Date of Patent: Jun. 8, 2004

(54) LOW PROFILE FASTENER HAVING A REPOSITIONABLE HANDLE CLIP

(75) Inventor: Craig L. Boe, Nampa, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/976,402

(22) Filed: Oct. 11, 2001

(65) Prior Publication Data

US 2003/0072636 A1 Apr. 17, 2003

(51) Int. Cl.⁷ .................................................. F16B 35/06
(52) U.S. Cl. ...................................................... 411/409
(58) Field of Search ................................. 411/402, 403, 411/407, 409, 435

(56) References Cited

U.S. PATENT DOCUMENTS

| | | | | |
|---|---|---|---|---|
| 66,585 | A | * | 7/1867 | Harvey |
| 1,024,100 | A | * | 4/1912 | Recker |
| 2,036,875 | A | * | 4/1936 | Kraft |
| 2,279,118 | A | * | 4/1942 | Fortune |
| 2,291,846 | A | * | 8/1942 | Taylor |
| 2,798,404 | A | * | 7/1957 | Schaefer |
| 4,419,029 | A | * | 12/1983 | Wenzel |
| 4,493,225 | A | * | 1/1985 | Galahad |

* cited by examiner

Primary Examiner—Flemming Saether
(74) Attorney, Agent, or Firm—Knobbe Martens Olson & Bear LLP

(57) ABSTRACT

A fastener having a head integral with an elongated shank projecting rigidly from the underside of the head. The shank has a threaded portion extending a predetermined length outwardly from the head, and which has a diameter smaller than the diameter of the head. The head has a first set of receiving holes and a second set of receiving holes which are substantially similar to the first set and are offset from the first set of receiving holes. The fastener has a clip removably attached to the head by inserting end portions of the clip into one of the first or second sets of receiving holes in the head.

18 Claims, 3 Drawing Sheets

LOW PROFILE FASTENER HAVING A REPOSITIONABLE HANDLE CLIP

BACKGROUND OF THE INVENTION

1. Field of the Invention

This invention relates generally to fasteners, and in particular, to fasteners with repositional clips for operating the fastener.

2. Description of the Related Art

Screw-type fasteners are often used to removably attach one component to another. Often, tools such as screwdrivers are not conveniently available, making it desirable to have a fastener that can be installed and removed without such tools. Fasteners can be designed with clips or rings that attach to the head of the fastener, thereby allowing an operator to grasp the clip or ring and rotate the fastener to either screw or unscrew the fastener into the component. In some fasteners, when not needed for use, these clips or rings may be pivoted to a not-in-use position so that they do not interfere with the use of the component.

Frequently, the component in which the fastener is inserted contains uneven surfaces proximate to the location where the fastener is received. In these situations, it is often the case that the clip will only lay flat in the desired not-in-use position when it is in certain orientations. This presents a problem if the final orientation of the fastener does not place the clip in this preferred orientation. In that case, the clip can be obstructed by the non-flat surfaces such that the clip either will not rest flat against the component or will otherwise be positioned in an undesirable orientation. Thus, there is a need for a fastener in which the clip can be removed and repositioned to a new, more convenient orientation without the necessity of unscrewing or otherwise undoing the fastener.

SUMMARY OF THE INVENTION

One embodiment of the invention is directed to a fastener including a head with a first pair of receiving holes and a second pair of receiving holes, wherein the receiving holes in the first pair have a diameter substantially the same as the diameter of the receiving holes in the second pair. The fastener further includes a shank projecting from the head, the shank comprising a threaded portion, wherein the shank has a diameter smaller than a diameter of the head. The fastener further includes a clip, wherein one side of the clip comprises two end portions with an opening therebetween, the end portions positioned in the first pair of receiving holes to pivotably attach the clip to the head, wherein the two end portions can be removed from the first pair of receiving holes and removably inserted into the second pair of receiving holes to reposition the clip.

Another embodiment of the invention comprises a method of changing the orientation of a clip attached to a fastener without unscrewing the fastener, the method including attaching the clip to the fastener via a first pair of receiving holes in the fastener, removing the clip from the first pair of receiving holes in the fastener if the clip undesirably contacts an obstruction when pivoting the clip and attaching the clip to the fastener via a second pair of receiving holes in the fastener wherein the second pair of receiving holes are offset from the first pair of receiving holes.

BRIEF DESCRIPTION OF THE DRAWINGS

These and other objects and features of the invention will become more fully apparent from the following description and appended claims taken in conjunction with the following drawings, where like reference numbers indicate identical or functionally similar elements.

DETAILED DESCRIPTION OF THE INVENTION

The following presents a detailed description of embodiments of the invention. However, the invention can be embodied in a multitude of different ways as defined and covered by the claims. The invention is more general than the embodiments that are explicitly described, and is not limited by the specific embodiments but rather is defined by the appended claims.

Figure 1:
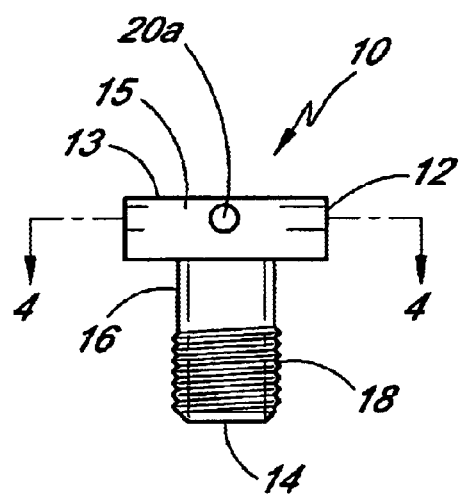
FIG. 1 is a side elevation view of a fastener according to one embodiment of the invention.

FIG. 1 illustrates a fastener 10 having a generally cylindrical head 12 integral with an elongated shank 14 projecting rigidly from the underside of the head 12. In one embodiment, a top surface 13 of the head 12 is flat and the head 12 is configured such that a side surface 15 of the head 12 has dimensions so that when installed in a device, the head 12 protrudes only a small distance from the device. In one embodiment, the fastener 10 is manufactured from stainless steel, such as 302 stainless steel, using methods well known in the art. However, one skilled in the art will appreciate that the fastener 10 can be manufactured from other materials, such as aluminum, brass, or plastic. In one embodiment, the head 12 is cylindrical in shape, however other shapes, such as a box-shape, can be used.

In one embodiment, the shank 14 has a cylindrical spacer section 16 which extends a predetermined length outwardly from the head 12, and which has a diameter smaller than the diameter of the head 12. The shank 14 also has a threaded portion 18 extending distally from the cylindrical spacer section 16. The shank 14 is of sufficient length to pass through a portion of a component, such that a portion of the threaded portion 18 extends through the component and is threaded into a receiving cavity in a device, thereby enabling the fastener 10 to secure the component to the device.

In one embodiment, the head 12 contains a first pair of receiving holes 20a and 20b (not shown) extending inwardly from substantially opposing locations in the side 15 thereof. The receiving holes 20a, 20b are positioned in the head such that they are 180 degrees apart, thereby locating them opposite each other with reference to the cylindrical head 12. The receiving holes 20a and 20b can be connected such that the holes pass through the entire diameter of the head 12. Alternately, the receiving holes 20a and 20b can each extend into the head 12 a distance less than one half the diameter of the head 12 such that the holes are not connected.

Figure 2:
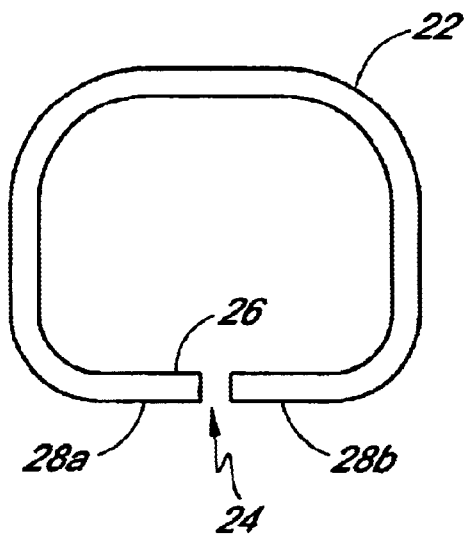
FIG. 2 is a side elevation view of a clip used with the fastener of FIG. 1.

FIG. 2 illustrates a clip 22 with an opening 24 in a bottom side 26 of the clip 22. Preferably, end portions 28a and 28b of the clip 22 are adjacent to the opening 24 and align in a substantially straight line. In one embodiment, the clip 22 is made of stainless steel, such as 19 gage stainless steel wire, although one skilled in the art can appreciate that other thickness of wire and other materials can be used.

Figure 3:
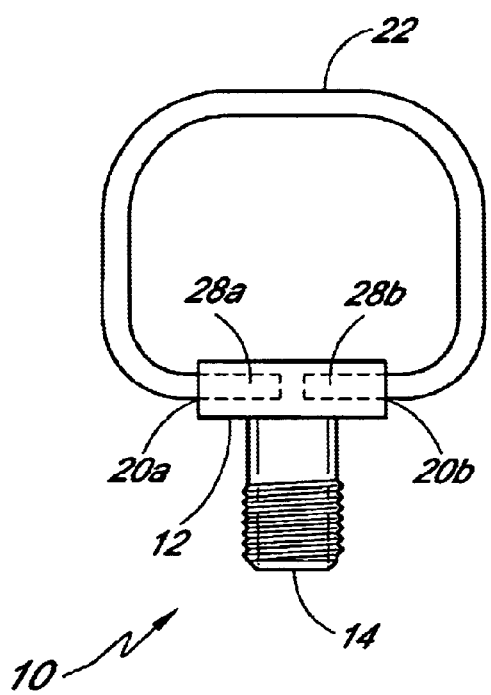
FIG. 3 is a side elevation view of the clip of FIG. 2 mounted on the fastener of FIG. 1 in a first pair of receiving holes.

FIG. 3 illustrates that the clip 22 is attached to the head 12 of the fastener 10 by inserting the end portions 28a and 28b into the receiving holes 20a and 20b respectively. The clip 22 is sufficiently rigid to allow an operator to grasp the clip 22 and rotate the fastener 10 about the longitudinal axis of the shank 14 to either thread or unthread the fastener 10 into a device without the need of additional tools. The receiving holes 20a and 20b have a diameter larger than the diameter of the end portions 28a and 28b, such that the end portions 28a and 28b are easily received into the holes 20a and 20b, allowing the clip 22 to pivot with respect to the head 12. Thus, the clip 22 may pivot from an in-use position in which a plane substantially encompassing the clip 22 is approximately parallel with the longitudinal axis of the shank 14, to a not-in-use position in which the plane substantially encompassing the clip 22 is approximately perpendicular to the longitudinal axis of the shank 14, such that the clip 22 can lay flat against a surface of a component to which the fastener 10 is attached. The end portions 28a and 28b are also of sufficient length that when they are inserted into the holes 20a and 20b as described above, the clip 22 can slide from one side to the other if the clip 22 engages an obstruction.

The clip 22 is made of a resilient material such that the end portions 28a and 28b can be pulled apart and removed from the one pair of receiving holes. When the pulling force is removed, the end portions 28a and 28b are spring biased to return to an unbiased position such that the opening 24 between the end portions 28a and 28b has a length smaller than the diameter of the head 12. Thus, the end portions 28a and 28b of the clip 22 are spring biased to remain in the receiving holes 20a and 20b, thereby securing the clip 22 to the head 12.

Figure 4:
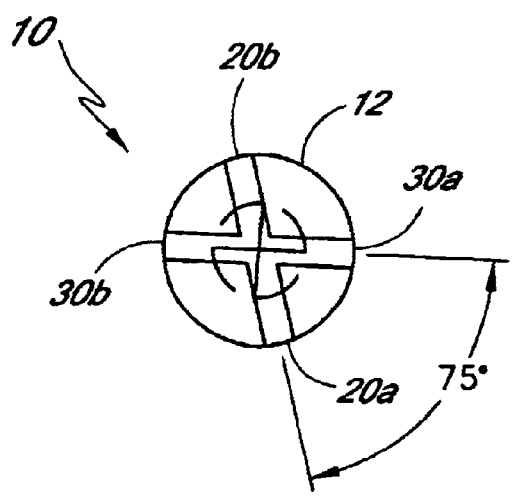
FIG. 4 is top cross-sectional view of the fastener of FIG. 1 taken along line 4—4 of FIG. 1.

FIG. 4 is a top cross-sectional view of the fastener 10. FIG. 4 illustrates that the head 12 has a second pair of receiving holes 30a and 30b offset from the first set of receiving holes 20a and 20b. The second pair of receiving holes 30a and 30b is substantially similar in diameter and vertical placement in the head 12 with respect to the first pair of receiving holes 20a and 20b. In one embodiment, the second pair of receiving holes 30a and 30b is offset between 70 and 90 degrees from the first pair of receiving holes. However, one skilled in the art will understand that various offset angles are contemplated depending on the configuration of the uneven surfaces on the component receiving the fastener 10.

Figure 5A:
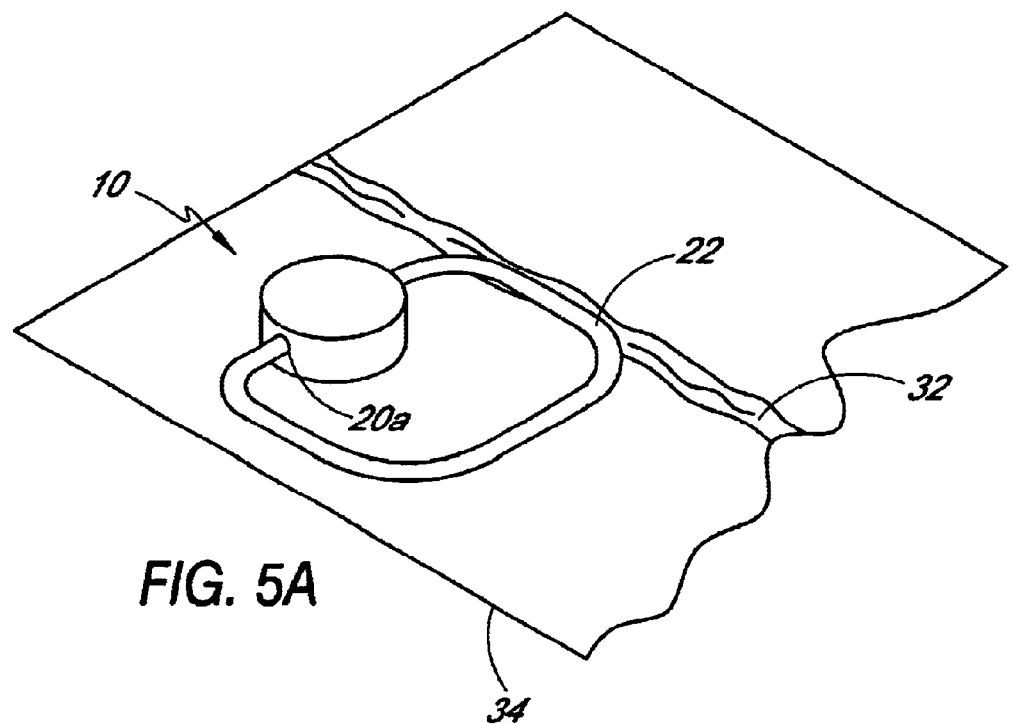
FIG. 5A is a perspective view of the fastener of FIG. 1 illustrating the clip obstructing a surface.
Figure 5B:
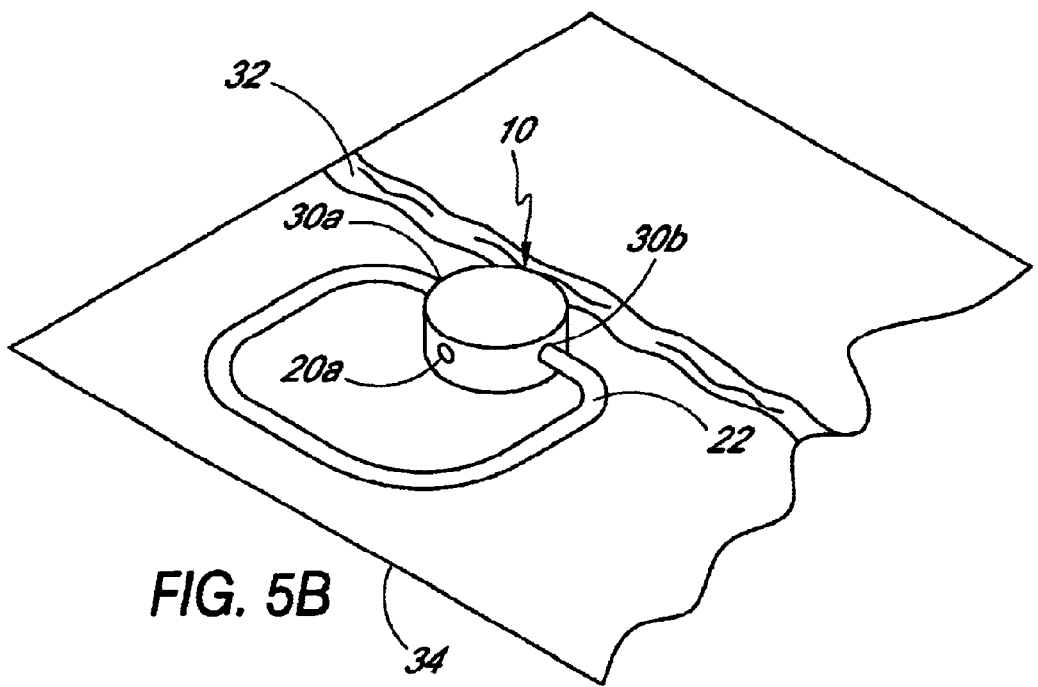
FIG. 5B is a perspective view of the fastener of FIG. 5A illustrating the clip repositioned to a second pair of receiving holes.

FIGS. 5A and 5B illustrate that the clip 22 can be physically removed from the first pair of receiving holes 20a and 20b and reconnected to the head 12 using the second pair of receiving holes 30a and 30b if the clip 22 is obstructed by a non-flat surface on the device to which the fastener 10 is attached or is otherwise in an undesirable orientation. In FIG. 5A, the clip 22 is obstructed by an uneven surface 32 on a component 34 when the clip 22 is attached to the first pair of receiving holes. In FIG. 5B, the clip has been repositioned to the second pair of receiving holes and can now be pivoted so that it can be folded flat against the component 34.

Providing fastener 10 with a clip 22 that can be repositioned by changing the orientation of the clip 22 with respect to the fastener head 12 without having to unscrew the fastener 10 satisfies a longstanding need in the industry. In the embodiment illustrated above, the clip 22 can be repositioned to an unobstructed orientation so it can lie flat in a not-in-use position. This fastener provides the convenience of a fastener that can be installed and removed without tools and also a clip that can be positioned in a desired orientation to reduce the interference with the component in which the fastener is installed.

Specific parts, shapes, materials, functions and modules have been set forth, herein. However, a skilled technologist will realize that there are many ways to fabricate the system of the present invention, and that there are many parts, components, modules or functions that may be substituted for those listed above. While the above detailed description has shown, described, and pointed out fundamental novel features of the invention as applied to various embodiments, it will be understood that various omissions and substitutions and changes in the form and details of the components illustrated may be made by those skilled in the art, without departing from the spirit or essential characteristics of the invention.

What is claimed is:

1. A fastener comprising:
   a head with a first pair of receiving holes and a second pair of receiving holes;
   a shank having a diameter smaller than a diameter of the head and projecting from the head, the shank comprising a threaded portion; and
   a one piece clip having first and second end portions, said clip being removably mounted on the head such that each of said first and second end portions is removably retained within one of either the first pair of receiving holes or the second pair of receiving holes, the first pair of receiving holes being not perpendicular to the second pair of receiving holes, wherein the clip is removable only as a single unit and wherein the clip is rigidly mounted in the head, such that the fastener can be rotated about a longitudinal axis of the shank by placing a rotating force on the clip, and wherein the clip is configured such that if it encounters an obstruction when being moved to a storage position, it is removable from said first or second pair of receiving holes and insertable in the other of said first or second pair of receiving holes so as to avoid the obstacle when being moved to a storage position.

2. The fastener of claim 1, wherein the fastener is adapted to be fitted through an orifice in a first component and to be threaded into a second component in order to secure the first component to the second component.

3. The fastener of claim 1, wherein the clip is spring biased such that the first and second end portions can be removed from the first pair of receiving holes and removably inserted into the second pair of receiving holes to reposition the clip with respect to the head.

4. The fastener of claim 1, wherein the clip is pivotably mounted in the head.

5. The fastener of claim 1, wherein the first pair of receiving holes has a diameter substantially the same as the diameter of the second pair of receiving holes.

6. The fastener of claim 1, wherein the second pair of receiving holes is offset between about 70 and 90 degrees from the first set of receiving holes.

7. The fastener of claim 1, wherein the clip is mounted in the head such that the end portions rotate within the receiving holes so as to pivot the clip between an in-use position and a not-in-use position.

8. A method of changing the orientation of a clip attached to a head of a fastener, said clip having first and second end portions, the method comprising:

attaching the clip to the fastener by inserting and retaining each of the first and second end portions within a first pair of receiving holes in the head of the fastener, said clip comprising a single, unitary piece of material;

removing the clip in a single unit from the first pair of receiving holes in the head of the fastener if the clip contacts an obstruction when said clip is being pivoted; and attaching the clip to the fastener by inserting and retaining each of the first and second end portions within a second pair of receiving holes positioned in the head of the fastener at a location which is and not perpendicular to the first pair of receiving holes.

9. The method of claim 8, wherein the clip is attached to the head such that the end portions rotate within the receiving holes so that the clip can pivot between an in-use position and a not-in-use position.

10. The method of claim 8, wherein removing the clip includes exerting a force sufficient to overcome a spring bias that urges the end portions to remain within the receiving holes.

11. The method of claim 8, wherein the clip is attached to the head such that the fastener can be rotated about a longitudinal axis of a shank of the fastener by placing a rotating force on the clip.

12. A fastener comprising:

means for attaching first and second end portions of a one piece clip to the fastener by inserting and retaining each of the first and second end portions within a first pair of receiving holes in a head of the fastener;

means for removing the clip in a single unit from the first pair of receiving holes in the head of the fastener if the clip contacts an obstruction when said clip is being pivoted; and means for attaching the first and second end portions of the one piece clip to the fastener by inserting and retaining each of the first and second end portions within a second pair of receiving holes positioned in the head of the fastener at a location which is offset from and not perpendicular to the first pair of receiving holes.

13. The fastener of claim 12, wherein the clip is spring biased such that the two end portions can be removed from the first pair of receiving holes and removably inserted into the second pair of receiving holes to reposition the clip with respect to the head.

14. The fastener of claim 12, wherein the clip is pivotably attached to the head.

15. A fastener comprising:

a head with a first pair of receiving holes and a second pair of receiving holes, wherein the first pair of receiving holes have a diameter which is substantially the same as the diameter of the receiving holes in the second pair, and wherein the first pair of receiving holes are offset from the second pair of receiving holes;

a shank projecting from the head, the shank comprising a threaded portion, wherein the shank has a diameter smaller than a diameter of the head;

a one piece clip, wherein one side of the clip comprises two end portions with an opening therebetween, the end portions being removably positioned in the first pair of receiving holes to pivotably attach the clip to the head, wherein the clip exhibits a spring bias to urge the end portions to remain positioned in the receiving holes, and wherein the end portions are configured to rotate axially within the receiving holes to permit movement of the clip from an operating position to a stored position;

wherein the two end portions are configured to be removed from the first pair of receiving holes in response to the clip contacting an obstruction while being moved toward the stored position, said end portions being removed by exerting a force sufficient to overcome the spring bias such that the clip is removed as a single unit and such that the two end portions can be removably inserted into the second pair of receiving holes, thereby repositioning the clip with respect to the head.

16. The fastener of claim 15, wherein the fastener is adapted to be fitted through an orifice in a first component and to be threaded into a second component in order to secure the first component to the second component.

17. The fastener of claim 15, wherein the clip is rigidly mounted in the head, such that the fastener can be rotated about a longitudinal axis of the shank by placing a rotating force on the clip.

18. The fastener of claim 15, wherein the first pair of receiving holes is offset by about 70 to 90 degrees from the second pair of receiving holes.

* * * * *

UNITED STATES PATENT AND TRADEMARK OFFICE
CERTIFICATE OF CORRECTION

PATENT NO. : 6,746,194 B2
APPLICATION NO. : 09/976402
DATED : June 8, 2004
INVENTOR(S) : Craig L. Boe It is certified that error appears in the above-identified patent and that said Letters Patent is hereby corrected as shown below:

In Column 5, Line 12, after "which is", please insert --offset from --

In Column 6, Line 9, after "from", please insert -- and not perpendicular to --

Signed and Sealed this

Twenty-third Day of October, 2007

JON W. DUDAS
*Director of the United States Patent and Trademark Office*